United States Patent [19]

Kosaka et al.

[11] Patent Number: 5,563,676
[45] Date of Patent: Oct. 8, 1996

[54] CAMERA HAVING STANDARD AND PANORAMIC FOCUSING MODES

[75] Inventors: Toru Kosaka; Kazuharu Imafuji, both of Kanagawa; Hidehiro Ogawa, Chiba-ken; Tsutomu Narisawa, Saitama-ken, all of Japan

[73] Assignee: Nikon Corporation, Tokyo, Japan

[21] Appl. No.: 423,997

[22] Filed: Apr. 18, 1995

[30] Foreign Application Priority Data

May 6, 1994 [JP] Japan .................... 6-094369

[51] Int. Cl.⁶ .................... G03B 13/36; G03B 17/02
[52] U.S. Cl. .................... 396/51; 396/123; 396/147
[58] Field of Search .................... 354/94, 159, 408, 354/409, 402, 407, 432

[56] References Cited

U.S. PATENT DOCUMENTS

| | | | |
|---|---|---|---|
| 4,597,659 | 7/1986 | Suda et al. | 354/409 |
| 5,128,705 | 7/1992 | Someya et al. | |
| 5,227,833 | 7/1993 | Ishida et al. | 354/402 |
| 5,307,111 | 4/1994 | Kurei | 354/402 |
| 5,307,112 | 4/1994 | Aoyama | 354/406 |
| 5,455,654 | 9/1995 | Suzuki | 354/402 |

FOREIGN PATENT DOCUMENTS 1-241511  9/1989  Japan.
1-279215  11/1989  Japan.

Primary Examiner—Michael L. Gellner
Assistant Examiner—Matthew Miller
Attorney, Agent, or Firm—Oliff & Berridge

[57] ABSTRACT

A camera capable of operating in a standard or a panoramic photography mode is provided with an automatic focusing system that focuses on a subject in one of a plurality of areas within a photographic field. In the standard photography mode, the camera automatically selects one of the plurality of areas based on a predetermined algorithm and focuses on the selected area. In the panoramic photography mode, the camera selects one of the plurality of area in response to a user performed operation and focuses upon the selected area. When operating in the panoramic photographic mode, an area can be selected by using a manual selection device, or through use of a visual line position detection device. The visual line position detection device determines which area in the photographic field the photographer's eye is focused upon, and the focused upon area is then selected. The camera may include a display device that indicates which of the plurality of areas has been selected.

20 Claims, 3 Drawing Sheets

CAMERA HAVING STANDARD AND PANORAMIC FOCUSING MODES

FIELD OF THE INVENTION

The present invention relates to automatic focusing cameras capable of standard and panoramic photographs.

DESCRIPTION OF RELATED ART

Many cameras of recent years are equipped with an auto-focus function that measures the distance to a subject, or that measures the required amount of photo lens focus shifting required to focus on the subject. Such systems can automatically drive the photo lens so as to compose an image of the subject onto a film surface.

In the early stages of manufacture, the action of the auto-focus function was carried out for the subject that existed in an auto-focus area, which was typically positioned at the center of the photographic field. However, there are many cases in which the primary subject is not necessarily positioned in the center of the photographic field. In order to resolve this problem, cameras have come to the marketplace with multi-point auto-focus devices that can measure the distance to subjects in multiple areas within the photographic field, or that can detect the amount of focus shifting of the photo lens required to focus on subjects in multiple areas within the photographic field.

Cameras with this type of auto-focus system typically measure the focusing condition of not only the subject at the center of the photographic field, but also of subjects in each of the multiple areas within the photographic field. The camera then selects distance data for one of the areas for use in focusing the camera. For example, one such auto-focus system would select the shortest distance among all the distances to the subjects in multiple areas as the distance for use in focusing the camera. The photo lens system would then be automatically driven so as to compose an image on the film surface, based on this selected distance.

Thus, cameras with an auto-focus function capable of determining focus conditions for multiple areas within a photographic field have been such that the camera automatically selects the distance which is thought to be most appropriate from among several distances, and drives the photo lens system to focus on a subject based on the selected distance. Various methods have been proposed for estimating and selecting the most appropriate distance from information relating to multiple distances.

However, in the case of panoramic photography, in which a photograph is taken which covers the film surface from top to bottom, it is conceivable that measurement areas could be positioned at the top and bottom of the photographic field. In this condition, there are cases in which the distance information that is automatically selected by the camera after carrying out distance measuring operations for several areas in the photographic field causes the camera to focus on a subject other than the subject which the photographer desires to photograph. For instance, if the shortest distance is the distance to a subject that is caught in a portion overhanging the edge of the film, and the camera automatically selects the shortest distance, then the majority of the photograph will be out of focus, even though the subject at the edge will be in focus. This is particularly problematic for camera utilizing a wide angle lens for panoramic photography, in which a relatively wide area is taken as the photographic field.

Japanese Unexamined Patent Application Hei 1-279215 shows a detailed example of the structure of a multi-point distance measuring optical system. The optical system comprises a projection lens that gathers light from the subject, a focus detection mask that is prepared with multiple apertures, a diaphragm mask, and multiple CCD's that are positioned so as to correspond to each aperture. A condenser lens is provided on the side of said apertures from which light exits, and an image composing lens that composes an image of the subject onto the CCD is provided on the side of said diaphragm mask from which light exits. The above-mentioned apertures correspond to each of the multiple areas within the photographic field. The distances to the subjects in each of the multiple areas within the photographic field are determined based on the size of the image on each CCD. Because this type of multi-point measuring system is commonly known and used technology, a detailed description is omitted.

SUMMARY OF THE INVENTION

It is an object of the present invention to provide a camera that avoids the above-mentioned problems so that a photograph is not taken while the camera is focused on the wrong subject.

DETAILED DESCRIPTION OF PREFERRED EMBODIMENTS

An embodiment of the present invention is described below with reference to the drawings.

Figure 1:
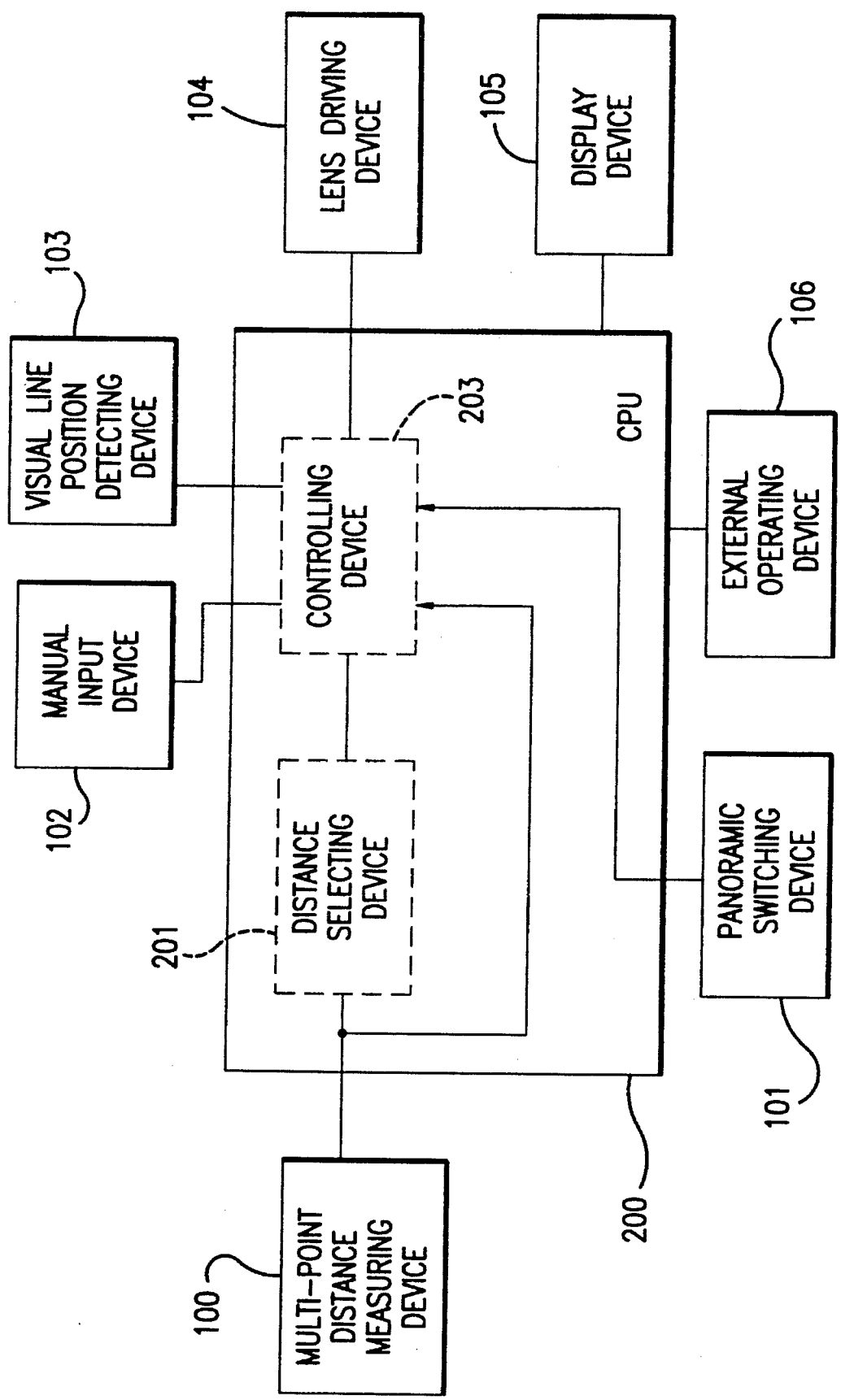
FIG. 1 is a diagram of a structure embodying the present invention.

FIG. 1 is a diagram showing a structure embodying the present invention. Each main structural element is described with reference to FIG. 1.

A CPU 200 controls the operation of the entire camera. A ROM and a RAM, which are not depicted in this figure, are normally connected to the CPU 200. The CPU 200 accomplishes various operations according to programs stored in the ROM. The results of various calculations carried out by the CPU 200 are stored in the RAM. Because a distance selecting device 201 and a controlling device 203 may be provided as part of a structure that includes the CPU 200, a ROM, and a RAM, FIG. 1 shows the distance selecting device 201 and the controlling device 203 inside the CPU 200.

A panoramic switching device 101 comprises an operating component that performs a switching function that allows the user to select between standard photography and panoramic photography. This device may be embodied, for example, in a switch or the like provided on the camera body.

A multi-point distance measuring device 100 measures the distance to subjects in each of a plurality of areas within the photographic field. Various methods have been proposed for measuring the distance to the subjects, and it is obvious that any of these methods may be successfully employed. As an example, a passive-style triangular measuring method may be employed in which images of the subject are composed onto a CCD via a two-component optical system affixed to the inside of the camera body. The distance to the subject is determined by calculating the relative distances of both images on the CCD. By performing this method for each of a plurality of predetermined areas in a photographic field, it is possible to measure the distance to subjects in each of the areas.

A distance selecting device 201 selects one piece of distance data from among multiple distance data measured by the multi-point distance measuring device 100 according to a predetermined method and outputs this data to the controlling device 203. Various methods for selecting a particular distance data are conceivable. For example, in one method, the shortest distance from among the distance data is selected as the distance data for use in focusing the camera.

A controlling device 203 sends the distance data selected by the distance selecting device 201 to a lens driving device 104 during normal photography. If panoramic photography is selected by the panoramic switching device 101, the controlling device 203 sends distance data relating to a subject in an area selected by a manual input device 102 or a visual line position detecting device 103, which will be described hereafter, to the lens driving device 104.

A lens driving device 104 drives the photo lens in such that an image of a subject in the selected area is focused on the film surface. The lens driving device drives the photo lens based on the distance data provided by the controlling device 203. The lens driving device 104 is embodied in a moving mechanism that can move over a fixed distance. For example, the lens driving device 104 may comprise a lens, a moving mechanism that can slide and which is attached to the lens, and an actuator that drives the moving component through a fixed distance. The distance that the moving component must move to focus the camera is calculated by the CPU 200 through a built-in program based on the distance data provided by the controlling device 203. The CPU 200 may have a structure such that a moving signal corresponding to the calculated result is sent directly to the above-mentioned actuator.

The manual input device 102 allows the photographer to instruct the controlling device 203 to send the distance data for a subject in a particular target area to the lens driving device 104. The photographer uses the manual input device 102 to indicate the target area from among multiple areas within the photographic field. For example, the structure may be such that a target area within the photographic field may be indicated through the operation of an operating component such as a switch or the like.

The visual line position detecting device 103 detects the visual line of sight of the photographer, by detecting the area in the photographic field upon which the photographer's eye is focusing. This device may be embodied in an optical system such as that disclosed in Japanese Unexamined Patent Application Hei 1-241511, or the like. For example, the visual line position detecting device 103 may comprise an infrared light emitting element, a beam splitter, a light collecting lens, and a CCD element. The visual line position detecting device 103 illuminates the eye of the photographer with an infrared light emitting element. The infrared rays reflected by the eye are then reflected by the beam splitter, collected by the light collecting lens, and composed into an image of the eyeball on the CCD element. The visual line of sight of the photographer is then calculated according to a calculating procedure of a calculating device based on the position of the composed image of the eyeball on the CCD.

The information concerning the visual line of sight of the photographer, or in other words, the information on the position of the composed image of the eyeball on the CCD, is sent to the CPU 200. The CPU 200 uses this information to determine which area within the photographic field the photographer is focusing on.

A display device 105 displays the multiple areas within the photographic field and shows the area selected by the manual input device 102 or by the visual line position detecting device 103. The display device 105 may also show the active condition of the functions of the camera (such as whether or not the auto-focus is currently active). This display device 105 may be embodied in a liquid crystal display device and a driving circuit. The display device 105 may be positioned within the viewfinder of the camera.

An external operating device 106 is provided to enable the photographer to instruct the camera to take a photograph. This device may be embodied, for example, in a switch with a half-press function. The external operating device 106 may operate such that a half-press action (to focus the camera) is performed by a first operation, and a release action (to take a photograph) is performed by a second operation.

A camera embodying the invention would also include the main structural components of a normal camera (not shown), such as a lens system, a photometer, an exposure device, a mode setting device which can set various operating modes, and a command dial that can set the content of the indicated modes. Since these various structural components can embody conventional technology, detailed descriptions of each structural element are omitted, and the essential structural components are described briefly below.

A photometer is a device for measuring the brightness information of the subject. The photometer comprises, for example, multiple photo diodes and current-to-voltage converting circuits for each photo diode. When a photometry is performed, the results are converted to a digital signal, through an A/D converter, and are sent to the CPU 200.

An exposure device is a device that controls the shutter speed and the like according to the results of a photometry in such a manner that the proper exposure will be carried out on the film surface. The exposure device may be embodied, for example, in various electronic devices such as a CMOS or the like. The calculation of the shutter speed is carried out by the CPU 200 according to a built-in program.

A mode setting device may be embodied in an operating component, such as a switch or the like, which is provided on the camera body. The command dial may be embodied in a dial-type switch.

When standard photography has been selected, a first set of operations are carried out. First, the multi-point distance measuring device 100 measures the distance to subjects in each of a plurality of areas within the photographic field. The distance selecting device 201 selects one piece of distance data from among the distance data for each of the plurality of areas as a selected distance according to a predetermined method. The distance selecting device 201 then transmits this selected distance data to the controlling device 203. The controlling device 203 sends the selected distance data to the lens driving device 104, and the auto-focus function is activated. The structure may be such that the above-described cycle of operations is carried out in response to the operation of the external operating device 106.

When panoramic photography has been selected through the operation of the panoramic switching device 101, a signal indicating the change is sent to the controlling device 203, and a different set of operations is carried out. In this case, the controlling device 203 interrupts the transmission of the selected distance data from the distance selecting device 201 to the lens driving device 104. The controlling device first determines which area from among the plurality of areas has been selected by the manual input device 102 or the visual line position detecting device 103. The controlling device 203 then transmits the distance data for the selected area to the lens driving device 104 as the selected distance data, and the auto-focus function is activated. In other words, one of the multiple distance measuring areas see up in the photographic field may be selected at will by the photographer through the operation of the manual input device 102 or the visual line position detecting means 103. The controlling device 203 then selects the distance data representing the distance to the subject in the selected area from among multiple distance data measured by the multi-point distance measuring device 100, and the controlling device 203 sends the selected distance data to the photo lens driving device 104.

The above described process ensures that a photograph can be taken with the desired subject in focus.

Figure 2:
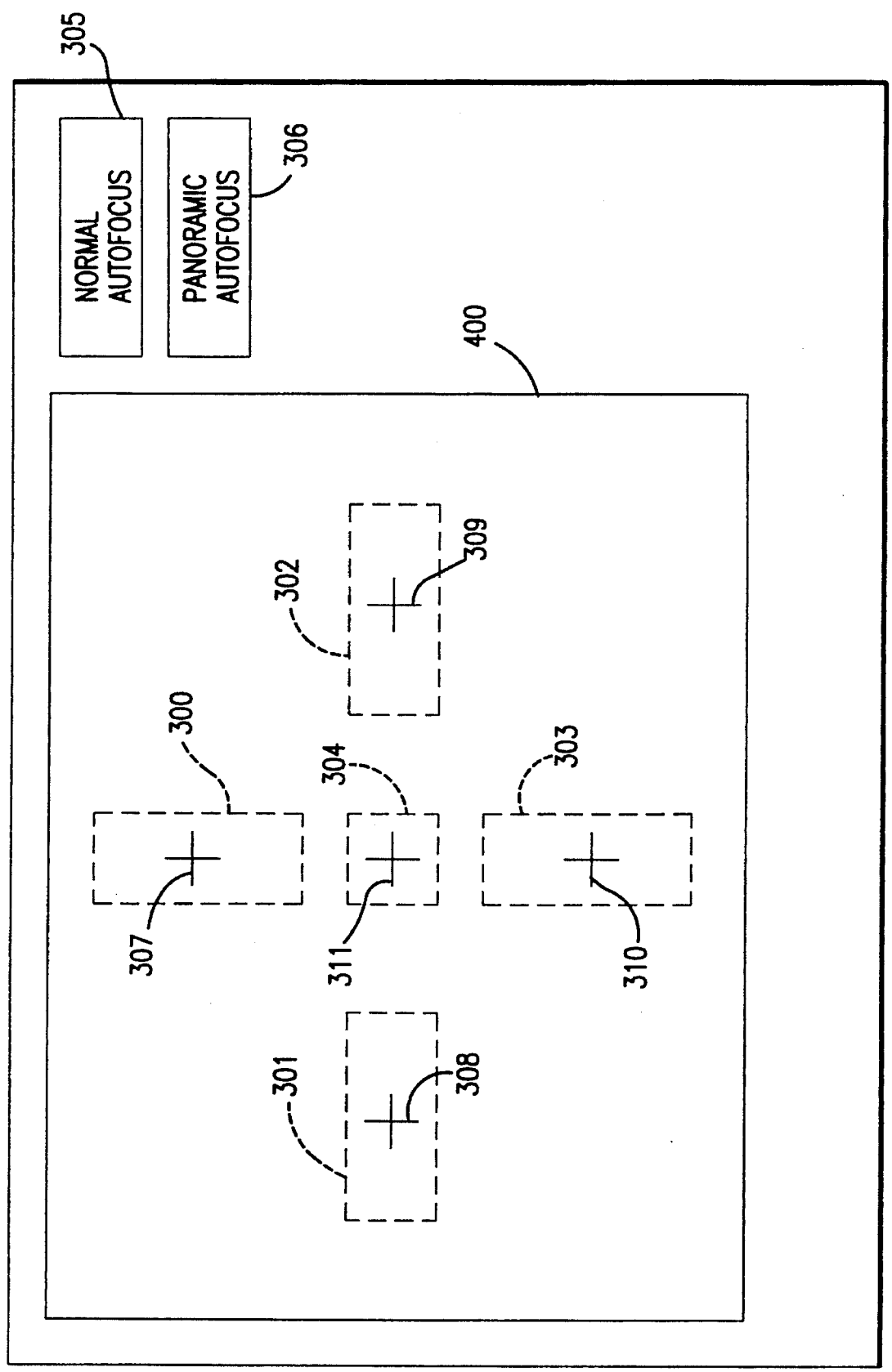
FIG. 2 is a diagram that shows a display condition inside the viewfinder of a camera.

FIG. 2 shows the display conditions of various displays that may be located within the viewfinder of a camera embodying the invention. An outline 400 is used to frame the photographic field that the photographer desires to photograph. Distance measuring areas 300, 301, 302, 303 and 304 are established inside the photographic field. The multi-point distance measuring device 100 measures the distance to subjects that exist in each of the distance measuring areas. The position and number of the distance measuring areas shown in FIG. 2 are exemplary and are not intended to be limiting. Other numbers and arrangements of distance measuring areas could also be used. When performing panoramic photography, each distance measuring area becomes an object of selection through operation of the manual input device 102 or the visual line position detecting device 103.

A normal autofocus display device 305 is lit when the auto-focus function has been activated during normal photography. The normal autofocus display device 305 may be a structural element of the display device 105. A panoramic autofocus display device 306 is lit when the auto-focus function has been activated during panoramic photography. The panoramic autofocus display device 306 may also be a structural element of the display device 105.

Nos. 307, 308, 309, 310, and 311 are displays (shown by "+" in the drawing) which indicate each of the distance measuring areas 300, 301, 302, 303, and 304. In FIG. 2, a condition is shown in which all the displays are activated. In actuality, only one display at a time is activated to indicate the area in the photographic field selected for use in focusing the camera. During normal photography, distance data from one area will be selected by the distance selecting device 201 according to a predetermined method. The display for the selected area will be activated to indicate the selected area. During panoramic photography, an area will be selected by the manual input device 102 or the visual line position detecting device 103. The display for the selected area will be activated to indicate the selected area.

Figure 3:
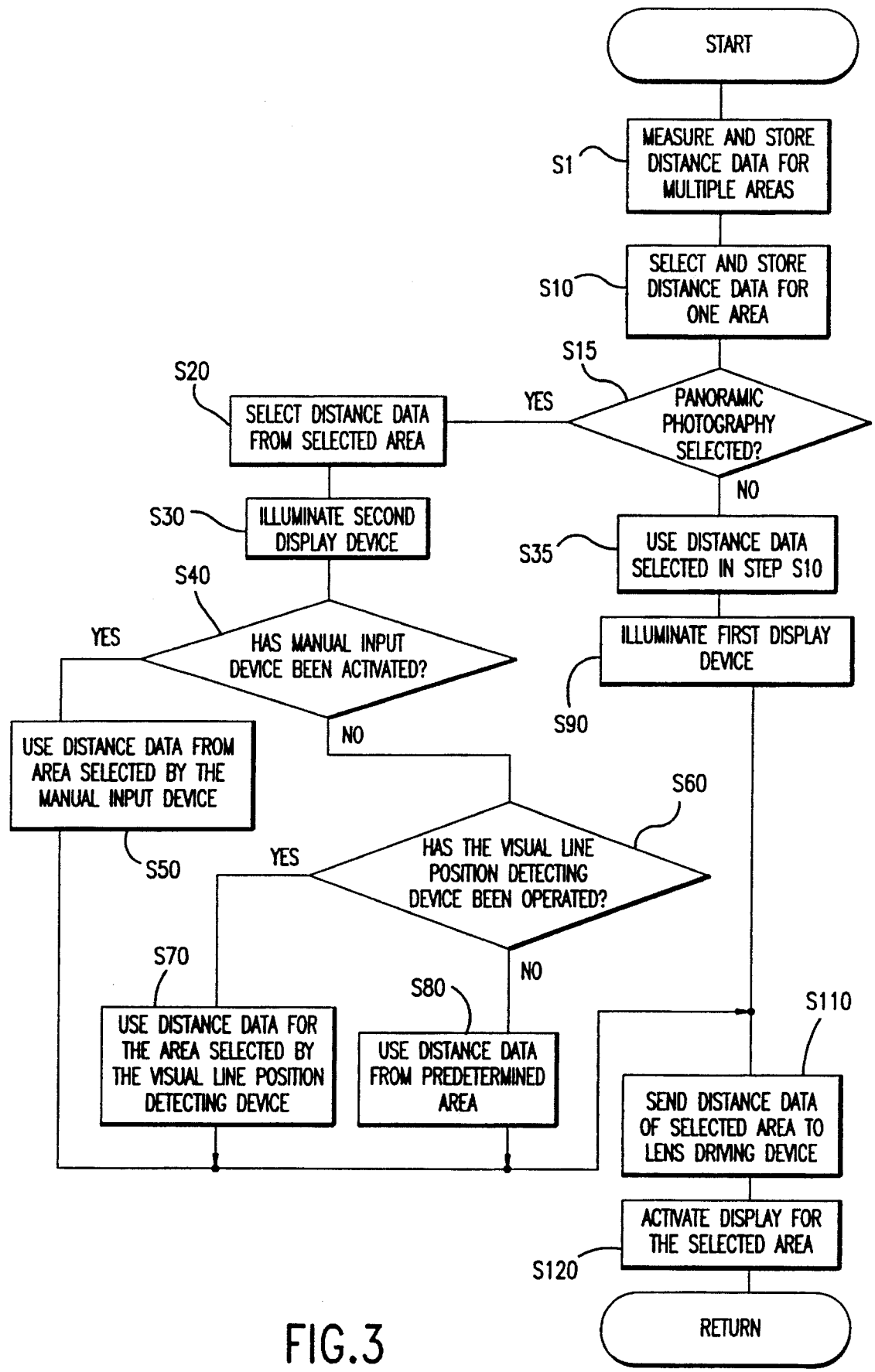
FIG. 3 is a flow chart of a process embodying the present invention.

FIG. 3 shows a flow chart that depicts one cycle of a process according to the present invention. The flow chart is intended to be an example only, other processes and methods could also be used to practice the invention.

The execution of the process begins with when the user conducts a half-press operation of the external operating device 106. The program for carrying out this process is stored in the ROM, and the execution of the program is carried out by the CPU 200.

In step S1, the CPU 200 activates the multi-point distance measuring device 100, which measures distance data for multiple areas in the photographic field. The distance data for each area is then stored in memory.

In step S10, an area is selected by the distance selecting device 201 according to a predetermined algorithm. The predetermined algorithm can, for example, select the area having the shortest measured distance data. The distance data corresponding to the selected area is then stored.

In step S15, the CPU 200 determines from the switch condition of the panoramic switching device 101 whether or not panoramic photography has been selected. If panoramic photography has been selected, the program proceeds to step S20; otherwise, the program proceeds to step S35.

In step S20, because panoramic photography has been selected, the controlling device 203 is instructed to operate so that distance data for the area selected by the manual input device 102 or by the visual line position detecting device 103 is used as the distance data for focusing the camera.

In step S30, the CPU 200 activates the panoramic autofocus display device 306, shown in FIG. 2, and the program proceeds to step S40.

In step S40, the CPU 200 determines whether or not the manual input device 102 has been operated. If the manual input device 102 has been operated (YES), the program moves to step S50; if the manual input device 102 has not been operated (NO), the program moves to step S60.

In step S50, the CPU 200 selects the distance data for the area selected through the operation of the manual input device 102 as the distance data for use in focusing the camera. The program then moves on to step S110.

In step S60, the CPU 200 determines whether or not the visual line position detecting device 103 has been operated, or in other words, whether or not the photographer has focused upon one of the multiple areas within the photographic field. If there is an area upon which the photographer has focused (YES), the program moves to step S70; otherwise (NO), the program moves to step S80.

In step S70, the CPU 200 selects the distance data for the area upon which the photographer has focused as the distance data for use in focusing the camera, and the program moves to step S110.

In step S80, if an area has not been selected through the manual input device 102 or the visual line position detecting device 103, the CPU 200 selects the distance data for an area according to a predetermined method, such as the area in the center of the photographic field, for use in focusing the camera.

If panoramic photography has not been selected in step S15, the program moves to step S35. In step S35, the distance data for the area selected in step S10 is selected as the distance data for use in focusing the camera.

In step S90, because panoramic photography has not been selected, the normal autofocus display device 305, as shown in FIG. 2, is activated, and the program moves to step S110.

In step S110, the distance data for the selected area is sent to the photo lens driving device 104, and the auto-focus function is performed.

In step S120, the display for the selected area is activated, and the program returns to the main program.

The above description is an example of one cycle of a process embodying the present invention. Any other processing order may also be used, provided that it accomplishes the result of the present invention.

The structure of a camera embodying the invention may include a display device (for example, a liquid crystal display device inside the viewfinder) that indicates the completion of the above process. The photographer may then discern when the process has ended, based on the condition of this display component, and he may release the external operating component 106.

As described above, a camera embodying the invention can avoid focusing upon a subject that is not the desired subject during panoramic photography. In other words, during panoramic photography, the photographer selects an area from among multiple areas within a photographic field. The camera can then focus upon and photograph a subject in the selected area by carrying out a focusing action of the lens system using distance information concerning the selected area.

What is claimed is:

1. A camera, comprising:

mode selecting means for selecting one of standard and panoramic photography operating modes;

focus detection means for detecting a focus condition of subjects in each of a plurality of areas within a photographic field;

first area selecting means for selecting one of the plurality of areas according to a predetermined algorithm in the standard photography operating mode;

second area selecting means for selecting one of the plurality of areas in response to one of a user performed operation and a predetermined operation in the absence of a user performed operation in the panoramic photography operating mode;

automatic focusing means for focusing the camera based on a focus condition of a selected area; and control means for controlling the operation of the camera, the control means causing the automatic focusing means to focus the camera based on the focus condition of the area selected by the first area selecting means when the standard photography mode is selected, the control means causing the automatic focusing means to focus the camera based on the focus condition of the area selected by the second area selecting means when the panoramic photography mode is selected.

2. The camera of claim 1, wherein said second area selecting means comprises a visual line position detecting means for detecting which of the plurality of areas within the photographic field the user's eye is focused upon and for selecting the focused upon area.

3. The camera of claim 2, wherein the second area selecting means further comprises manual input means for manually selecting one of the plurality of areas.

4. The camera of claim 3, further comprising display means for indicating which of the plurality of areas has been selected by one of the first and second area selecting means.

5. The camera of claim 4, wherein the display means also indicates when the camera is focused on a subject in a selected area.

6. The camera of claim 1, wherein the second area selecting means comprises manual input means for manually selecting one of the plurality of areas.

7. The camera of claim 1, further comprising display means for indicating which of the plurality of areas has been selected by one of the first and second area selecting means.

8. A camera, comprising:

a mode selection switch for selecting one of standard and panoramic photography operating modes;

a focus detector that detects a focus condition of subjects in each of a plurality of areas within a photographic field;

a first area selector that selects one of the plurality of areas according to a predetermined algorithm in the standard photography operating mode;

a second area selector that selects one of the plurality of areas in response to one of a user performed operation and a predetermined operation in the absence of a user performed operation in the panoramic photography operating mode;

an automatic focusing system that focuses the camera based on a focus condition of a selected area; and a controller that controls the operation of the camera, the controller causing the automatic focusing system to focus the camera based on the detected focus condition of the area selected by the first area selector when the standard photography mode is selected, the controller causing the automatic focusing system to focus the camera based on the detected focus condition of the area selected by the second area selector when the panoramic photography mode is selected.

9. The camera of claim 8, wherein said second area selector comprises a visual line position detector that detects which of the plurality of areas within the photographic field the user's eye is focused upon and that selects the focused upon area.

10. The camera of claim 9, wherein the second area selector further comprises a manual input device that allows the user to manually select one of the plurality of areas.

11. The camera of claim 10, further comprising a display that indicates which of the plurality of areas has been selected by one of the first and second area selectors.

12. The camera of claim 11, wherein the display also indicates when the camera is focused on a subject in the selected area.

13. The camera of claim 8, wherein the second area selector comprises a manual input device that allows the user to manually select one of the plurality of areas.

14. The camera of claim 8, further comprising a display that indicates which of the plurality of areas has been selected by one of the first and second area selectors.

15. A method of controlling the operation of a camera capable of operating in standard and panoramic photography modes and having an automatic focusing system, the method comprising the steps of:

selecting one of standard and panoramic photography operating modes;

detecting a focus condition for a plurality of areas within a photographic field;

selecting one of the plurality of areas based on a predetermined algorithm when the standard photography operating mode is selected;

selecting one of the plurality of areas in response to one of a user performed operation and a predetermined operation in the absence of a user performed operation when the panoramic photography operating mode is selected;

focusing the camera based on the detected focus condition of the area selected according to a predetermined algorithm when the standard photography operating mode is selected; and focusing the camera based on the detected focus condition of the area selected in response to a user performed operation when the panoramic photography operating mode is selected.

16. The method of claim 15, wherein the step of selecting one of the plurality of areas in response to a user performed operation comprises the steps of:

detecting an area that a user's eye is focused upon; and selecting the focused upon area.

17. The method of claim 15, wherein the step of selecting one of the plurality of areas in response to a user performed operation comprises operating a manual input device to select one of the plurality of areas.

18. The method of claim 15, further comprising the step of indicating which of the plurality of areas has been selected.

19. The method of claim 18, further comprising the step of indicating when the camera is focused on a subject in a selected area.

20. The method of claim 15, wherein the step of selecting one of the plurality of areas in response to a user performed operation comprises the steps of:

operating a manual input device to select one of the plurality of areas when the user intends to manually select an area; and detecting an area that the user's eye is focused upon and selecting the focused upon area when the user has not operated the manual input device.

* * * * *